(12) United States Patent
Deng et al.

(10) Patent No.: US 6,715,363 B1
(45) Date of Patent: Apr. 6, 2004

(54) METHOD AND APPARATUS FOR STRAIN AMPLIFICATION FOR PIEZOELECTRIC TRANSDUCERS

(75) Inventors: Kan Deng, Gaithersburg, MD (US); Fred Schloss, Arlington, VA (US); Paul A. Wlodkowski, Rockville, MD (US); Thurston L. Brooks, III, Ijamsville, MD (US)

(73) Assignee: Wilcoxon Research, Inc., Gaithersburg, MD (US)

( * ) Notice: Subject to any disclaimer, the term of this patent is extended or adjusted under 35 U.S.C. 154(b) by 0 days.

(21) Appl. No.: 09/252,972

(22) Filed: Feb. 19, 1999

Related U.S. Application Data

(60) Provisional application No. 60/075,298, filed on Feb. 20, 1998.

(51) Int. Cl.[7] .............................................. G01B 7/16
(52) U.S. Cl. ........................................................ 73/782
(58) Field of Search .......................... 73/782, 774, 584, 73/589, 654, 88.5, 862.043, 862.042, 862.046, 862.041, 105; 310/329

(56) References Cited

U.S. PATENT DOCUMENTS

| | | | |
|---|---|---|---|
| 3,311,761 A | | 3/1967 | Schloos |
| 3,697,790 A | * | 10/1972 | Flint et al. ..................... 310/8.3 |
| 3,858,440 A | * | 1/1975 | Budraitis ...................... 73/782 |
| 3,891,870 A | * | 6/1975 | Corbett ........................ 310/8.7 |
| 4,189,655 A | | 2/1980 | Bruel |
| 4,314,481 A | * | 2/1982 | Wolfer et al. ................. 73/774 |
| 4,439,705 A | * | 3/1984 | Corbett ......................... 73/765 |
| 4,473,768 A | * | 9/1984 | Kerr et al. .................... 310/329 |
| 5,029,478 A | * | 7/1991 | Wamstad ...................... 73/706 |
| 5,339,697 A | * | 8/1994 | Mullin ................... 73/862.043 |
| 5,604,667 A | * | 2/1997 | Morimoto ................... 361/760 |
| 5,638,822 A | * | 6/1997 | Seyed-Bolorforosh et al. ....................... 128/662.03 |
| 5,767,405 A | * | 6/1998 | Bernstein et al. ......... 73/504.16 |
| 5,841,217 A | * | 11/1998 | Kizaki et al. ................ 310/348 |
| 5,889,214 A | * | 3/1999 | Kang et al. ............ 73/862.044 |
| 5,912,601 A | * | 6/1999 | Unami et al. ................ 333/187 |

* cited by examiner

Primary Examiner—Harshad Patel
(74) Attorney, Agent, or Firm—Blank Rome, LLP

(57) ABSTRACT

A method and apparatus for mechanical strain amplification for enhanced piezoelectric transduction. The device consists of a piezoelectric element elevated above the neutral axis of a supporting, micromachined, photoetched substrate by use of castellations on the substrate. By elevating the piezoelectric element above the neutral axis, the charge sensitivity of the device is increased which facilitates the development of high-sensitivity, low-noise transducers. There is a limit to charge sensitivity because the optimal elevation is a function of the physical properties of the supporting structure and the piezoelectric element. Accordingly, a mathematical formulation and finite element analysis (FEA) are provided to define the optimal height of the castellated substrate. The recognition of limits to the castellation height has further led to the discovery of using the relaxor-ferroelectric, single crystal class of materials in the present invention. Because the modulus of these materials is an order of magnitude less than that of piezoelectric ceramics, their use in the method of strain amplification is synergistic due to enhanced piezoelectric coefficients and the ability to extend castellation height. Furthermore, the simplicity of the transducer design, and the fact that its components are selected from photoetched, micromachined parts, result in unprecedented low costs of manufacturing for industrial-grade sensors. This method and apparatus for mechanical strain amplification is integral to a diverse group of piezoelectric-based transducers and sensors, such as accelerometers, velocity sensors, mechanical impedance heads, and hydrophones.

22 Claims, 4 Drawing Sheets

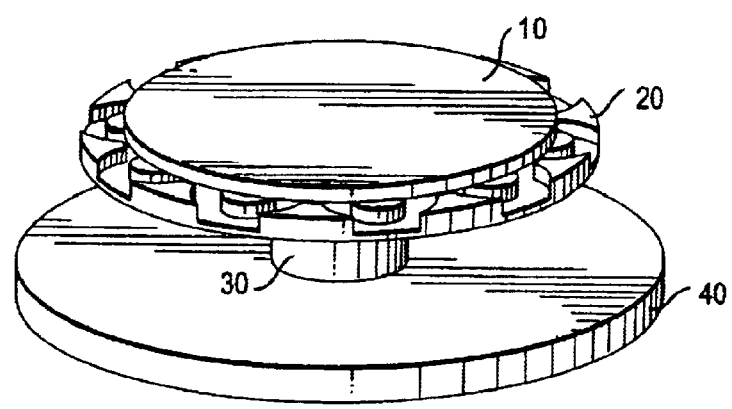
FIG. 1
FIG. 2
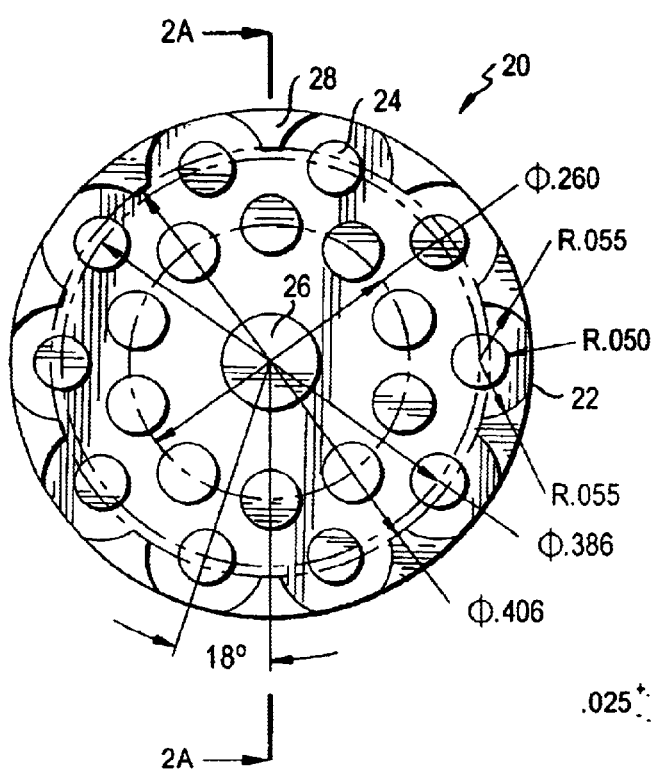
FIG. 2A
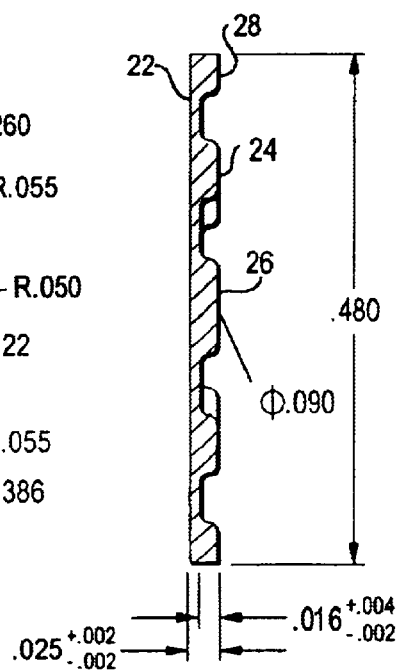

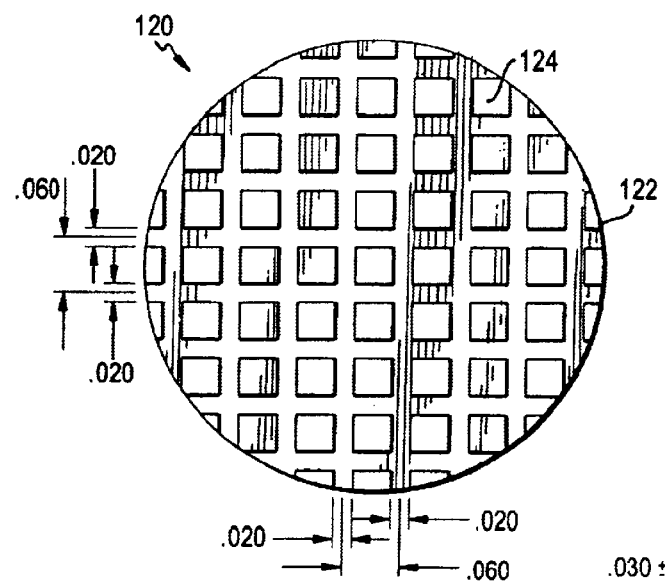
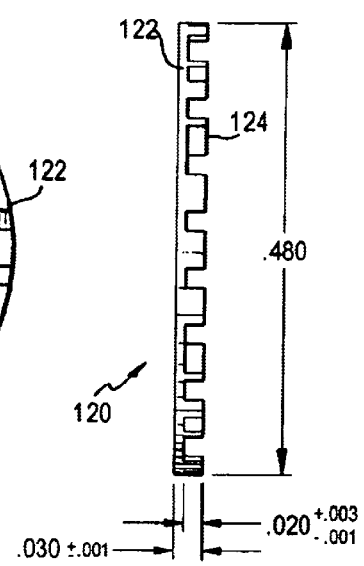
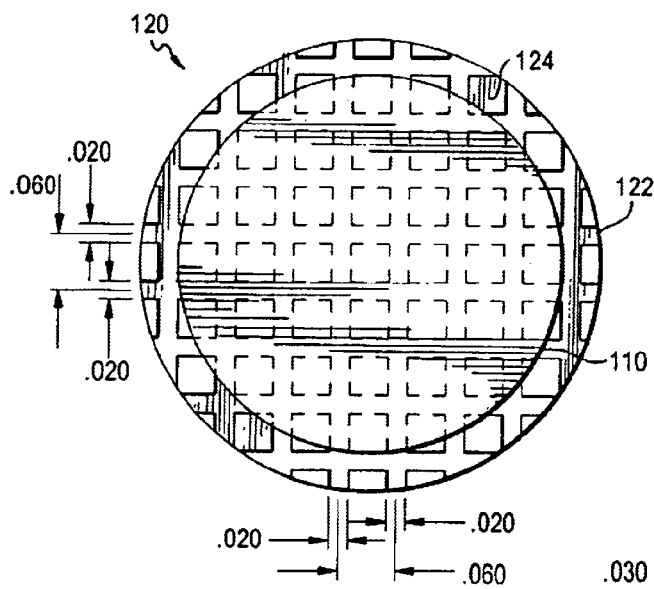
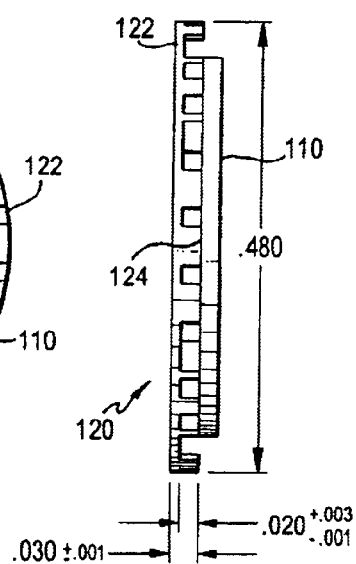

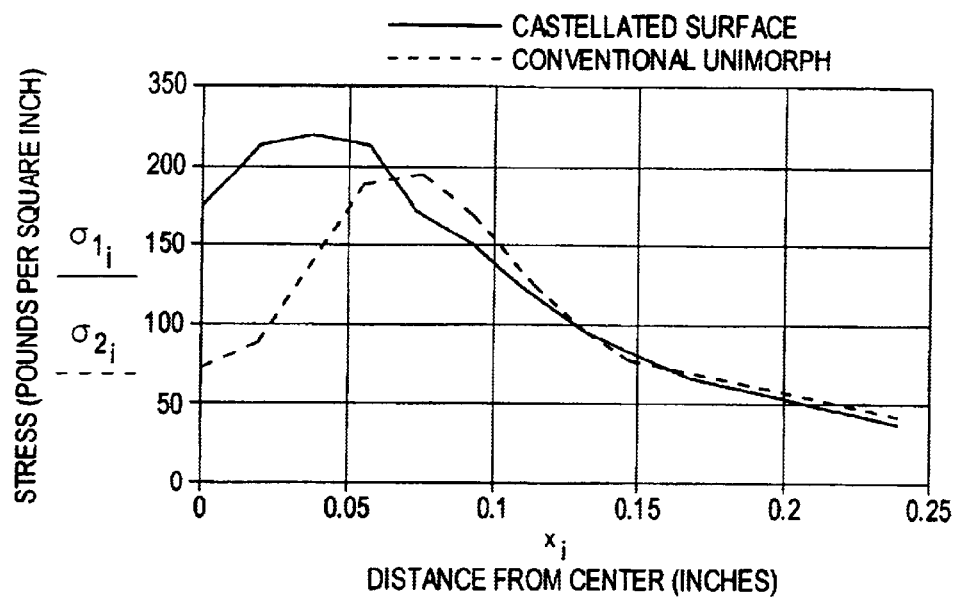
FIG. 5 COMPARISON OF STRESS DISTRIBUTION
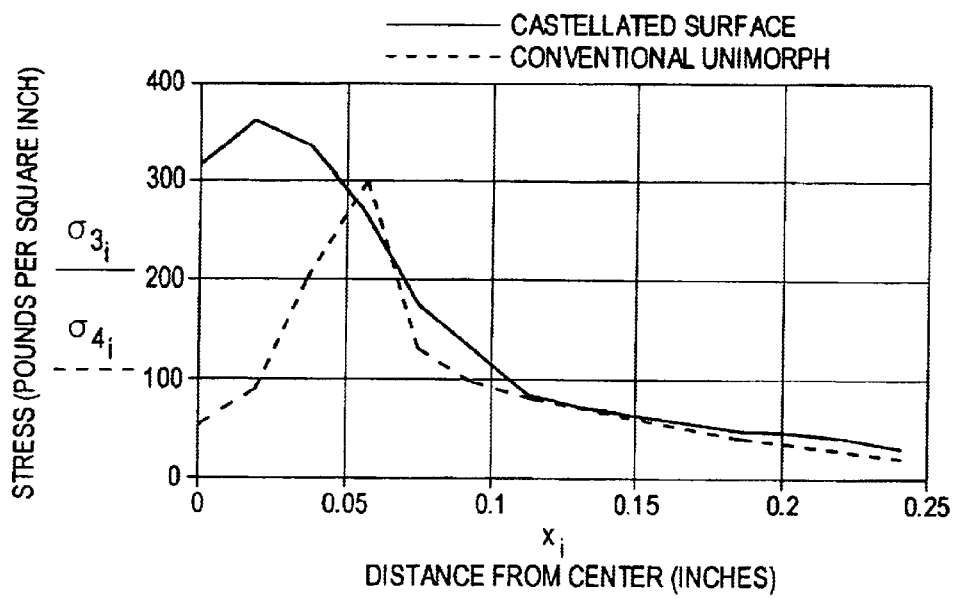
FIG. 6 STRESS DISTRIBUTIONS (RELAXOR)

METHOD AND APPARATUS FOR STRAIN AMPLIFICATION FOR PIEZOELECTRIC TRANSDUCERS

RELATED APPLICATION

This application is a non-provisional application based on provisional application serial No. 60/075,298, filed Feb. 20, 1998, the full disclosure of which is incorporated by reference herein.

FIELD OF THE INVENTION

The present invention relates to a novel method and apparatus for strain amplification for piezoelectric transducers. Specifically, the invention relates to strain amplification by elevating the piezoelectric crystal above the neutral axis of the plate by castellations formed on the plate.

BACKGROUND OF THE INVENTION

The measurement of strain is accomplished using a piezoelectric crystal mounted on a supporting plate which is attached to a base which communicates with a structure to be monitored. In the typical case, the crystal is mounted on a so-called "unimorph" supporting plate which is attached in direct contact over substantially the entire surface of the piezoelectric crystal. It has long been well known to make such unimorph transducers using piezoelectric materials. It has also long been well known that single crystal piezoelectric materials could be used in such unimorph transducers. However, the sensitivity of such a transducer structure is limited by the physical dimensions and material properties of the sensing components of the transducer. It is therefore desirable to improve the sensitivity for a transducer of a given class or application without changing the overall physical dimensions of the transducer.

SUMMARY OF THE INVENTION

The present invention addresses the shortcomings of the existing piezoelectric transducers and provides improved sensitivity for a given application by providing a transducer configuration which amplifies the strain for a transducer otherwise having the same given physical dimensions and made up of the same given transducer materials. This is accomplished by a transducer having a mounting plate for mounting the piezoelectric crystal in which the mounting plate has raised protrusions which offset the crystal from the surface of the mounting plate. In profile, these protrusions resemble the gun placements of a castle turret and hence are referred to herein as "castellations." The castellations produce significant increases in sensitivity. Circular or waffle pattern castellations are specifically shown, although other configurations are contemplated.

The devices which utilize the method and apparatus of the present invention (for example, accelerometers, velocity sensors, impedance heads, and hydrophones) exhibit a higher charge sensitivity and resonance frequency than existing transducers. These advantages extend the number of applications and efficacy of the devices. It is the purpose of this invention to provide a predictable and hitherto unattained quality factor as is defined herein. Moreover, the simplicity of the design and micromachined, photoetched castellated components contribute to a low cost of manufacturing not evidenced in the existing transducers. This is achieved by using the castellated surface on which the piezoelectric transducer is mounted.

BRIEF DESCRIPTION OF THE DRAWINGS

FIG. 1 is a perspective view of a sensor crystal mounted on a disc-shaped supporting plate having circular or disc-shaped castellations protrusions thereon;

FIG. 2 shows a plan view of a disc-shaped castellation surface having circular or disc-shaped castellation protrusions;

FIG. 2A shows a sectional view of the castellation disc of FIG. 2 along line 2A—2A of FIG. 2;

FIG. 3, shows a plan view of a disc-shaped castellation surface having square protrusions to form a waffle plate surface;

FIG. 3A shows a side view of the castellation disc of FIG. 3;

FIG. 4 shows a sensor crystal mounted on a waffle plate castellation surface;

FIG. 4A shows a side view of the crystal/waffle plate of FIG. 4;

FIG. 5 shows a comparison of stress distribution for conventional and castellated surfaces employing conventional piezoelectric ceramic material;

FIG. 6 shows a comparison of stress distributions for conventional and castellated surfaces employing single crystal (relaxor) piezoelectric material;

DETAILED DESCRIPTION OF THE PREFERRED EMBODIMENT

Figure 7:
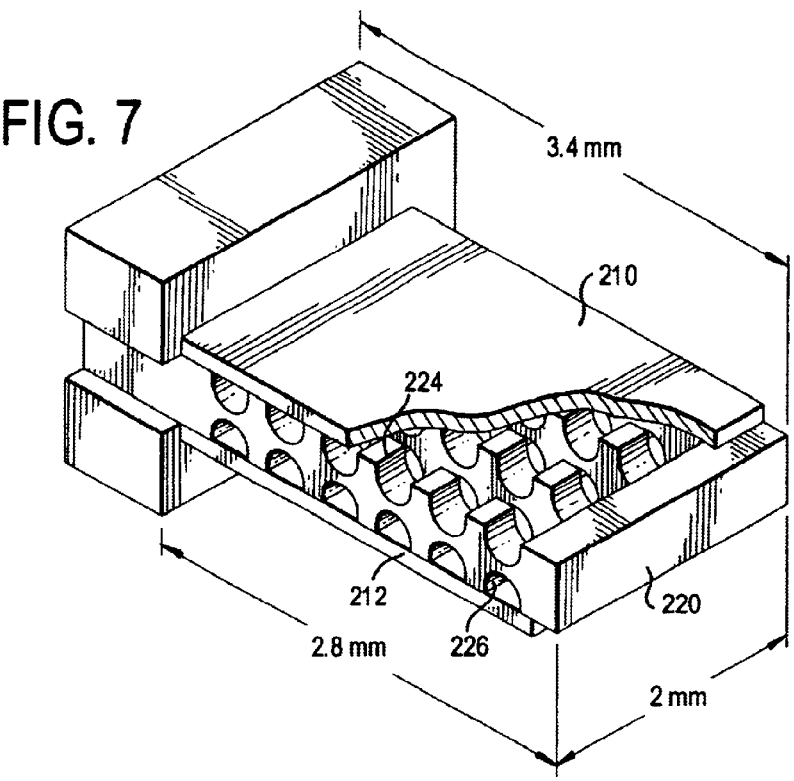
FIG. 7 shows an alternative embodiment of a bimorph mesoscale accelerometer having a substrate having castellations on both sides and sandwiched between two plates of single crystal piezoelectric material.

Referring now to the drawings, a first embodiment is shown below in FIGS. 1 and 2. FIG. 1 shows a piezoelectric crystal 10 mounted on a mounting plate or castellation surface 20 which is supported at its center by central support 30 emanating from base or contact surface 40. FIGS. 2 and 2A show further details of castellation surface 20 of FIG. 1. Castellation surface 20 is shown as a disc-shaped element 22 having a plurality of circular protrusions 24 thereon, accompanied by a central support protrusion 26 and peripheral arcuate-shaped protrusions 28.

Another design for the supporting plate is illustrated in FIGS. 3 and 3A. FIGS. 3 and 3A show a variation of mounting plate or castellation surface 20, designated castellation surface 120 having square (or rectangular) protrusions 124 on disc-shaped element 122. The pattern formed by the protrusions 124 is a waffle pattern. FIGS. 4 and 4A show the waffle pattern castellation surface 120 of FIGS. 3 and 3A with a piezoelectric crystal 110 mounted thereon. Of course, a different castellation pattern, such as that of FIGS. 2 and 2A could also be used.

Referring now to theoretical considerations, there are three main designs (modes) for piezoelectric-based accelerometers: compression, shear, and flexural. The present invention is of the flexural type. Vibrations are transmitted through the base and supporting plate onto the crystal which is affixed to the plate by means of attachment typically used in accelerometers. To understand the contribution of the castellations to strain amplification, a case is considered below for a thin piezoelectric layer positioned on a flat metallic circular plate supported at the center. The equation relating the resonance frequency of the plate through its mechanical properties is shown below (see A. Leissa, *Vibration of Plates*, Acoustical Society of America, 1993, p. 16.):

$$\lambda^2 = \omega \cdot a^2 \cdot \sqrt{\frac{\rho}{D}} \quad (1)$$

where: ω is the resonance frequency;

$$D = \frac{E \cdot h^3}{12 \cdot (1 - \nu^2)}$$

is the flexural rigidity of structure; ρ is the material density; E is the Young's modulus; a the radius; h is the plate thickness; ν is its Poisson's ratio; and λ is a modal parameter whose values are given in the aforementioned reference.

The maximum stress generated in the piezoelectric material determines the charge sensitivity of the element. The bending moment on the disc, as a function of radius, is given by the following equation:

$$M_r = -q\left[\frac{1}{16}(3+\nu)\cdot(r^2-R^2) + \frac{(1+\nu)\cdot R^2}{4}\cdot \ln\left(\frac{R}{r}\right)\right] \quad (2)$$

where: ν is the Poisson's ratio, q is the force per unit area and R is the radius of the disc. The maximum stress $\sigma_{max}$ is given by a formula of the type:

$$\sigma_{max} = k\frac{qa^2}{h^2} \quad (3)$$

where: k is constant relating the radii, a is the outer radius, and h is the thickness of the disc. (see S. Timoshenko, *Theory of Plates and Shells*, McGraw-Hill, Inc., New York, 1959, p.61.)

The charge sensitivity Q of the flexural device, expressed in terms of pico-Coulombs per the gravitational unit of acceleration (pC/g) is given by the following equation:

$$Q = d_{31} \cdot A \cdot \kappa \cdot \sigma_{max} \quad (4)$$

where: $d_{31}$ is a piezoelectric constant expressing the ratio of strain developed along the specified axes for the piezoelectric material, A is the area of crystal, and κ is a constant relating the average stress over the plate to the maximum.

The effect of the castellations are now demonstrated and are compared to a conventional flexural design.

As shown in the figures, a piezoelectric crystal is placed on the supporting plate as illustrated in FIGS. 1 and 4. This invention is not limited to any particular configuration of the castellations. Any castellation configuration (including the density of the field of protrusions, the shape of the castellations, etc.) will provide an amplification. The exact embodiment of the underlying structure is also not specific to this invention. Any shape, such as round, square, elongated beam or otherwise, will yield a working device. Optimizing the design of the castellation and overall structure, however, can maximize the output. For the purposes of illustration, a circular disc structure and pillar castellations are illustrated in a first embodiment, but this in no way should be construed as the only embodiment of this concept.

A conventional unimorph sensing structure, employing a 0.020' thick PZT crystal (lead zirconate titanate) on a stainless steel disc (outer diameter 0.480') was used as a benchmark for comparison. This conventional design, without castellations, obeys equations 1–4. A key measure of the transducer's efficacy is the quality factor which is defined as the product of the charge sensitivity and the square of the resonance frequency, in kilohertz (kHz). The conventional unimorph sensing structure exhibited an average resonance frequency of 20.8 kHz and a charge sensitivity of 16.5 pC/g. The resulting quality factor is 7139. By comparison, the castellated designs of the present invention reached a resonance frequency of 28.1 kHz and a charge sensitivity of 18.7 pC/g. The resulting quality factor is 14,766, which is an increase of more than a factor of two.

The results of the finite element analysis indicate an optimum castellation height of 0.020 inches, for a disc having dimensions as illustrated in FIG. 3. FIGS. 5 and 6 show stress distribution comparisons for conventional unimorph surfaces and castellated surfaces. Consistent with the experimental results on the quality factor, the theoretical stress distributions (derived from finite element analysis) are illustrated in FIG. 5 comparing the present invention with the conventional unimorph. The average stresses are calculated by the following equation:

$$\bar{\sigma} = \frac{2\pi \int_0^R \sigma(r) r \, dr}{\pi R^2} \quad (5)$$

where: R is the radius of the plate. Hence, the area under the curve in FIG. 5 determines the overall sensitivity of the device.

The method of strain amplification is further demonstrated by theoretical models provided in Appendices 1 and 2. In the example in Appendix 1, a piezoelectric beam is elevated above its supporting stainless steel plate. The material properties are listed, and the stress generated in the piezoelectric element is shown as a function of the elevation above its neutral axis. What is significant, however, is the distinct presence of an optimal height. Although this simplified, theoretical model differs from the castellated structure described above, the constituent parameters of strain amplification are better understood through this parametric analysis. The analysis in Appendix 2 further reveals the nature of the invention.

Enhancing the transducer's output is not simply a matter of elevating the castellations. The mechanical properties of the supporting plate and the configuration of the castellations, as well as the properties of the piezoelectric crystal itself, define an optimum castellation height. To obtain this maximum point, both traditional mechanical analysis and finite element analysis (FEA) were employed.

The embodiments of FIGS. 1–4 can be conceptualized as being comprised of a composite structure of three layers. The top layer is the piezoelectric sensing disc, the middle layer is comprised of the individual, castellated elements, and the bottom layer is the supporting/bending substrate. The top layer responds to stress/strain in a bending (flexural) mode. In generalized form, Hooke's law (also called the elastic constitutive relation) may be written in the following form:

$$\sigma_{\alpha\beta} = C_{\alpha\beta\gamma\delta} \epsilon_{\gamma\delta} \quad \alpha,\beta,\gamma,\delta = 1,2,3 \quad (6)$$

where, σ and ε are second rank stress and strain tensors, respectively, and C is a fourth rank transformation tensor. For a transversely isotropic material (properties of x=y), the characteristic array of elastic coefficients for the middle castellated layer can be defined by the following tensor (see A. P. Boresi and K. P. Chong, *Elasticity in Engineering*

*Mechanics*, Elsevier Science Publishing Co., Inc., New York, 1987, pp. 250–259.):

$$C_{\alpha\beta} = \begin{pmatrix} C_{11} & C_{12} & C_{13} & 0 & 0 & 0 \\ C_{12} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{55} \end{pmatrix} \quad (7)$$

where:

$$C_{11} = \frac{(1-nv_{zx}^2)E_x}{AB}, \quad C_{12} = \frac{(v_{xy}+nv_{zx}^2)E_x}{AB}, \quad C_{13} = \frac{v_{zx}E_x}{B}$$

$$C_{33} = \frac{(1-v_{xy})E_z}{B}, \quad C_{44} = \frac{1}{2}(C_{11}-C_{12}),$$

$$C_{55} = G_{xz} = G_{yz} = \frac{E_z}{2(1+v_{xz})}$$

$$A = 1+v_{xy}, \quad B = 1-v_{xy}-2nv_{zx}^2, \quad \text{and} \quad n = \frac{E_x}{E_z}$$

and where the ratio n is a measure of the degree of an isotropy, $v_{xy}=v_{yz}=v_{xz}$ is Poisson's ratio (0.3 for a typical metal), and $E_x$, $E_y$ and $E_z$, are the moduli of the respective axes. For the special case:

$$E_x = E_y \ll E_z, \text{ and } E_z = E_{substrate} \quad (8)$$

the stresses in the transverse x and y directions approach zero, while the strain in the z axis approaches the strain of the supporting/bending substrate (bottom layer).

Hence, any middle layer structure or material that minimizes the transverse stress in the x and y axes will simultaneously maximize the stress transferred to the piezoelectric sensing element in the z axis. This leads to a further conclusion that an optimum design is not simply a matter of shifting the neutral axis, but also the means by which one chooses to do so. Specifically, a middle layer that directly transfers the strain energy without "draining" a portion of the available energy to deform the middle layer will optimize performance. The modulus of the top layer acts to constrain and stiffen the overall structure. Therefore, any reduction of the modulus of the top sensing structure will result in increased strain in the sensing material, and associated higher sensitivity.

The recognition of limits to the castellation height and its relationship with the top layer modulus, thus further leads to the use of the relaxor-ferroelectric class of materials in the present invention. Because the modulus of the relaxor materials, in select orientations, is an order of magnitude less than comparable piezoelectric ceramics, their use in the method of strain amplification is synergistic due to enhanced piezoelectric coefficients and the ability to extend castellation height (and hence, increase stress/strain in the sensing top layer). The results of the finite element analysis, employing the single crystal relaxor material and comparing the castellated and unimorph embodiments, are shown in FIG. 6. The specifications for a single crystal relaxor material were provided by TRS Ceramics, Inc. However, other suppliers of such materials are contemplated. Given these results and the additional benefit that the piezoelectric coefficients for relaxor-based materials are an order of magnitude higher than PZT, the quality factor can increase by at least a factor of 20.

The present invention contemplates the use of single crystal piezoelectric materials (but is not restricted to single crystal technology) in miniature, high sensitivity transducers such as accelerometers. These transducers will have overall physical dimensions in the mesoscale range, obviating the requirement of growing large diameter (>1 cm) crystals. As a result, a broad range of dynamic sensing applications are possible. One area is Condition Based Maintenance (CBM), which is one of the Department of Defense's highest technology priorities. CBM is similarly valued in the private sector where reduced equipment downtime results in a higher level of productivity. In these cases, the utilization of piezoelectric single crystals have the potential for a miniature accelerometer with unprecedented low levels of noise and maximum dynamic range in packages of ever decreasing size.

To appreciate the effect of stress amplification through castellations, reference is made to FIG. 7 which shows an alternative embodiment having a castellated stainless steel beam 220 sandwiched between single crystal piezoelectric plates 210, 212. The beam has castellations 224 on its upper side and castellations 226 on its lower side. The dimensions of the beam are 2.8 mm (length), 2.0 mm (width), and the thickness is 0.4 mm. The equivalent bending stiffness factor of the composite structure is given by the following expression:

$$K(x) = 1 + 2 \cdot x^3 \cdot y + 6 \cdot x \cdot y \cdot (x+1)^2 \quad (9)$$

where x is the ratio of the single crystal beam's thickness to the thickness of the stainless steel substrate; and y is the ratio of their respective Young's moduli (see J. P. Den Hartog, *Mechanical Vibrations*, Dover Publications, 4$^{th}$ Edition, New York, 1984, p. 153.) Accordingly, the resonance frequency of the structure is defined by the equation below:

$$f(x) = \frac{3.52}{2 \cdot \pi \cdot l^2} \sqrt{\frac{K(x) \cdot E \cdot I}{\rho(x)}} \quad (10)$$

where l is the length of the beam; E is the modulus of the steel reinforcing plate; I is the steel plate's moment of inertia; and $\rho(x)$ is the unit length density of the composite beam (see W. C. Young, *Roark's Formulas for Stress & Strain*, McGraw Hill, 6$^{th}$ Edition, New York, 1989, p.118.) The resulting resonance frequency is determined to be approximately 50 kHz.

By integrating the stress over the entire length of the single crystal material, one can obtain the charge sensitivity Q as per equation (11) below:

$$Q = 2 \cdot d_{31} \cdot w \cdot \int_0^{4'} \sigma(x) dx \quad (11)$$

where w is the width of the crystal beam. The resulting charge sensitivity for the composite structure is evaluated at approximately 1.9 pC/g, which is an impressive output for a mesoscale transducer.

Figure 8:
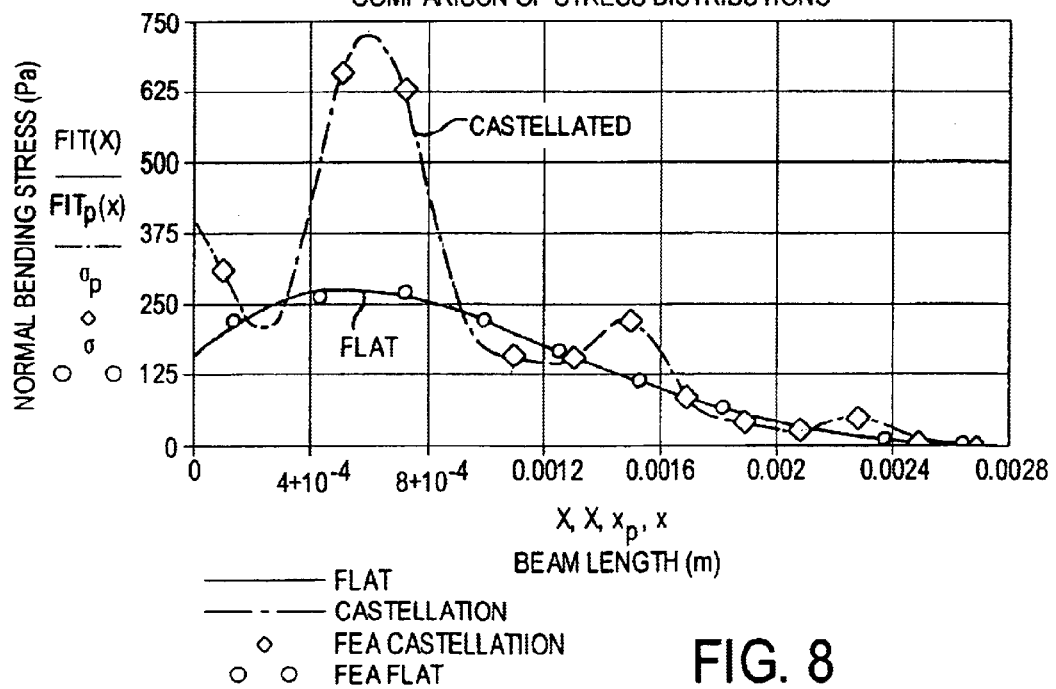
FIG. 8 shows a comparison of the stress distributions for a bimorph structure (flat versus castellated) and employing single crystal piezoelectric material.

The effect of the castellations is now demonstrated by FEA, and its results are illustrated in FIG. 8. Enhanced stress in the crystal, due to mechanical amplification, increases the charge sensitivity by a factor of two (2) to an unprecedented level of 4 pC/g. The expected performance characteristics of the new design are shown below in Table 1, and compares the performance of a sensor based on the embodiment in FIG. 7 with that of a conventional miniature piezoelectric accelerometer (Murata model PKGS-25LA-TC).

The specifications for a prototype transducer according to the first embodiment of the present invention are shown in Appendix 3. A comparison between a conventional unimorph transducer and a transducer in accordance with the first embodiment invention is shown in Appendix 4.

Another variation of the method and apparatus of the present invention is as follows: If the metallic substrate is inverted and the piezoelectric disc is fixed to the flat surface, an increase in the quality factor will also be observed. Although this increase is not as substantial as in the case described earlier, it is noteworthy. The castellated elements, now inverted, serve as additional mass loading. Their contribution to increasing stress in the piezoelectric disc more than offsets the corresponding drop in resonance frequency. This enhancement of the quality factor was verified by experiment: the quality factor of the conventional unimorph was 7139 as compared to 10,830 for the inverted castellated design. Moreover, the low cost of manufacturing transducers in this manner from photoetched components is a significant improvement over existing transducers.

Yet another variation of the method and apparatus of the present invention is if the substrate is castellated on both sides, as shown in FIG. 7, then one not only obtains the shift of the neutral axis effect, but simultaneously increases mass loading without paying the attendant stiffening penalty associated with simply making the supporting/bending substrate thicker. Moreover, the bimorph design is practically impervious to the pyroelectric effect.

Whereas the aforementioned embodiments describe a piezoelectric material elevated above the neutral axis by means of castellations, it is also possible to obtain the method of strain amplification by employing a monolithic, middle layer whose physical properties obey equations 6–8. In such a manner, a material, whose compliance in the z direction (perpendicular to the surface of the piezoelectric material) is much less than in the x and y directions (parallel to the surface of the piezoelectric material), would exhibit "virtual castellations" and obtain results identical to the previous embodiments. At present, the physical introduction of castellations into the sensing plate structure, by means of photoetching, is the most cost-effective means of attaining the method of strain amplification.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method for amplifying strain in piezoelectric transducers comprising the steps of:
    providing a mounting plate having a neutral axis and raised protrusions,
    providing a piezoelectric crystal,
    placing said piezoelectric crystal in contact with said mounting plate such that said raised protrusions displace said crystal from said mounting plate neutral axis.

2. A piezoelectric transducer comprising:
    a mounting plate having a neutral axis and a plurality of raised protrusions thereon,
    a piezoelectric crystal mounted on said mounting plate protrusions so as to be displaceable from said neutral axis.

3. A piezoelectric transducer as in claim 2, wherein said protrusions are circular and arranged in a symmetrical pattern.

4. A piezoelectric transducer as in claim 2, wherein said protrusions are square and arranged in a symmetrical waffle-like pattern.

5. A strain amplifying mounting plate for a piezoelectric transducer comprising:
    a mounting plate conforming to a shape for a piezoelectric crystal to be mounted thereon, said mounting plate having a neutral axis; and
    a plurality of protrusions formed on said mounting plate, said protrusions extending from said neutral axis and providing a surface to which a piezoelectric crystal is mountable so as to be displaced from said neutral axis.

6. A mounting plate as in claim 5 wherein said protrusions are circular and arranged in a symmetrical pattern.

7. A mounting plate as in claim 5 wherein said protrusions are square and arranged in a symmetrical waffle-like pattern.

8. A piezoelectric transducer comprising:
    a mounting plate having a neutral axis and a plurality of raised protrusions thereon,
    a relaxor-ferroelectric, single crystal class material disc mounted on said mounting plate protrusions so as to be displaceable from said neutral axis.

9. A piezoelectric transducer comprising:
    a mounting plate having a neutral axis and a plurality of raised protrusions on both sides of said plate;
    a first piezoelectric crystal mounted on one side of said mounting plate so as to be displaceable from said neutral axis; and
    a second piezoelectric crystal mounted on said mounting plate protrusions on the other side of said mounting plate so as to be displaceable from said neutral axis.

10. A piezoelectric transducer as in claim 9, wherein said protrusions are circular and arranged in a symmetrical pattern.

11. A piezoelectric transducer as in claim 9, wherein said protrusions are square and arranged in a symmetrical waffle-like pattern.

12. A strain amplifying mounting plate for a piezoelectric transducer comprising:
    a mounting plate conforming to a shape for piezoelectric crystals mountable on either side thereof, said mounting plate having a neutral axis; and
    a plurality of protrusions formed on said mounting plate, said protrusions formed on both sides of said mounting plate and extending from said neutral axis and providing surfaces on both sides of said plate to which a piezoelectric crystal is mountable so as to be displaced from said neutral axis.

13. A mounting plate as in claim 12 wherein said protrusions are circular and arranged in a symmetrical pattern.

14. A mounting plate as in claim 12 wherein said protrusions are square and arranged in a symmetrical waffle-like pattern.

15. A piezoelectric transducer comprising:
    a mounting plate having a neutral axis and a plurality of raised protrusions on both sides of said plate;
    a first relaxor-ferroelectric, single crystal class material mounted on said mounting plate protrusions so as to be displaced from said neutral axis; and
    a second relaxor ferroelectric, single crystal class material mounted on said mounting plate protrusions on the other side of said mounting plate so as to be displaced from said neutral axis.

16. A piezoelectric transducer comprising:
    a mounting plate having a neutral axis and a mounting surface, said mounting surface having a greater stiffness in a direction perpendicular to said mounting surface than in a direction parallel to said mounting surface, and a piezoelectric crystal mounted on said mounting plate such that said crystal is elevated above said neutral axis by said mounting surface having a greater stiffness in the direction perpendicular to said mounting surface.

17. A method for amplifying strain in a piezoelectric transducer comprising the steps of:

defining a neutral axis in a mounting plate;

providing a plurality of protrusions on said mounting plate raised above said neutral axis;

placing a piezoelectric crystal in contact with said mounting plate such that said raised protrusions displace said crystal from said mounting plate neutral axis, thereby increasing the strain in said piezoelectric crystal.

18. A method for amplifying strain in a piezoelectric transducer, said piezoelectric transducer having a mounting plate and a piezoelectric crystal mountable on said mounting plate, said method comprising the steps of:

defining a neutral axis on said mounting plate;

providing raised protrusions on said mounting plate;

placing said piezoelectric crystal in contact with said mounting plate such that said raised protrusions displace said crystal from said mounting plate neutral axis, thereby increasing the sensitivity of said piezoelectric transducer to strain induced in said transducer.

19. A method for amplifying strain in a piezoelectric transducer comprising the steps of:

defining a neutral axis in a mounting plate;

providing a plurality of protrusions in said mounting plate raised above said neutral axis;

placing a piezoelectric crystal in contact with said mounting plate such that said raised protrusions displace said crystal from said mounting plate neutral axis, whereby said displacement of said piezoelectric crystal amplifies the strain in said piezoelectric crystal.

20. A method for amplifying strain in a piezoelectric transducer, said piezoelectric transducer having a mounting plate and piezoelectric crystal mountable on said mounting plate, said method comprising the steps of:

defining a neutral axis on said mounting plate;

providing raised protrusions on said mounting plate;

placing said piezoelectric crystal in contact with said mounting plate such that said raised protrusions displace said crystal from said mounting plate neutral axis, whereby said displacement of said piezoelectric crystal amplifies the strain in said piezoelectric crystal.

21. A mounting plate for a piezoelectric transducer comprising:

a mounting plate conforming to a shape for a piezoelectric crystal mountable thereon, said mounting plate having a neutral axis; and a plurality of protrusions formed on said mounting plate, said protrusions extending outward from said neutral axis and providing a surface to which a piezoelectric crystal is mountable so as to be displaced from said neutral axis;

whereby said displacement of said piezoelectric crystal from said neutral axis amplifies the strain in said piezoelectric crystal.

22. A mounting plate for a piezoelectric transducer comprising:

a mounting plate conforming to a shape for piezoelectric crystals mountable on either side thereof, said mounting plate having a neutral axis; and a plurality of protrusions formed on said mounting plate, said protrusions formed on both sides of said mounting plate and extending outward from said neutral axis and providing surfaces on both sides of said plate to which a piezoelectric crystal is mountable so as to be displaced from said neutral axis;

whereby said displacement of said piezoelectric crystals from said neutral axis amplifies the strain in said piezoelectric crystals.

* * * * *